(12) United States Patent
Lokhandwala et al.

(10) Patent No.: US 10,819,611 B2
(45) Date of Patent: Oct. 27, 2020

(54) DYNAMIC TIMEOUT-BASED FAULT DETECTION

(71) Applicant: VMware, Inc., Palo Alto, CA (US)

(72) Inventors: Zeeshan Lokhandwala, Santa Clara, CA (US); Medhavi Dhawan, Cupertino, CA (US); Dahlia Malkhi, Palo Alto, CA (US); Michael Wei, Palo Alto, CA (US); Maithem Munshed, Palo Alto, CA (US); Ragnar Edholm, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 34 days.

(21) Appl. No.: 16/211,027

(22) Filed: Dec. 5, 2018

(65) Prior Publication Data
US 2020/0186455 A1  Jun. 11, 2020

(51) Int. Cl.
*H04L 12/26*  (2006.01)
*H04L 12/707*  (2013.01)
*H04L 12/24*  (2006.01)

(52) U.S. Cl.
CPC ........ *H04L 43/103* (2013.01); *H04L 41/0672* (2013.01); *H04L 41/0686* (2013.01); *H04L 45/22* (2013.01)

(58) Field of Classification Search
None
See application file for complete search history.

(56) References Cited

U.S. PATENT DOCUMENTS

| 5,448,719 A * | 9/1995 | Schultz ............... G06F 12/0866 711/141 |
| 6,173,323 B1 * | 1/2001 | Moghe .................... H04L 43/10 340/10.1 |
| 2002/0152446 A1 * | 10/2002 | Fleming .............. G06F 11/0715 714/815 |
| 2011/0222447 A1 * | 9/2011 | Wang ..................... H04L 1/188 370/310 |

FOREIGN PATENT DOCUMENTS

JP    2002141920 A  *  5/2002

OTHER PUBLICATIONS

Machine translation of JP2002141920A, from Google Patents, downloaded on Feb. 6, 2020. (Year: 2002).*

* cited by examiner

*Primary Examiner* — Faruk Hamza
*Assistant Examiner* — Cassandra L Decker

(57) ABSTRACT

Techniques for implementing dynamic timeout-based fault detection in a distributed system are provided. In one set of embodiments, a node of the distributed system can set a timeout interval to a minimum value and transmit poll messages to other nodes in the distributed system. The node can further wait for acknowledgement messages from all of the other nodes, where the acknowledgement messages are responsive to the poll messages, and can check whether it has received the acknowledgement messages from all of the other nodes within the timeout interval. If the node has failed to receive an acknowledgement message from at least one of the other nodes within the timeout interval and if the timeout interval is less than a maximum value, the node can increment the timeout interval by a delta value and can repeat the setting, the transmitting, the waiting, and the checking steps.

21 Claims, 4 Drawing Sheets

DYNAMIC TIMEOUT-BASED FAULT DETECTION

BACKGROUND

In distributed systems such as distributed databases/key-value stores, cloud computing platforms, industrial control systems, and so on, fault detection mechanisms are commonly employed to monitor the health of system nodes. When such a mechanism detects the failure of a particular node, the node is typically removed (or marked as failed) in the distributed system's internal configuration so that the system can continue operating correctly using the remaining healthy (i.e., active) nodes. If the failed node later recovers from the failure and comes back online, the distributed system can re-add the node to the internal configuration at that time, thereby allowing the system to re-attain its prior level of redundancy/availability.

One existing approach for implementing fault detection (referred to herein as static timeout-based fault detection) involves sending, by at least one node in the distributed system, request (i.e., poll) messages to other system nodes on a periodic basis. Upon sending a poll message to a given recipient node, the polling node waits for an acknowledgement (i.e., ACK) message from the recipient node over a static timeout interval (e.g., 5 seconds). If the polling node receives an ACK message from the recipient node within the static timeout interval, the polling node concludes that the recipient node is still active. Conversely, if the polling node does not receive an ACK message within the static timeout interval, the polling node concludes that the recipient node has failed.

While static timeout-based fault detection works well in distributed systems that are fully synchronous (i.e., systems that exhibit well-defined and consistent communication latencies between active nodes), this mechanism is problematic for distributed systems that are partially synchronous (i.e., systems that can, on occasion, exhibit unexpected and/or significantly variable communication latencies between active nodes). This is because in partially synchronous distributed systems, there is no guarantee that ACK messages from active recipient nodes will always be returned to the polling node within the static timeout interval.

DETAILED DESCRIPTION

Figure 1:
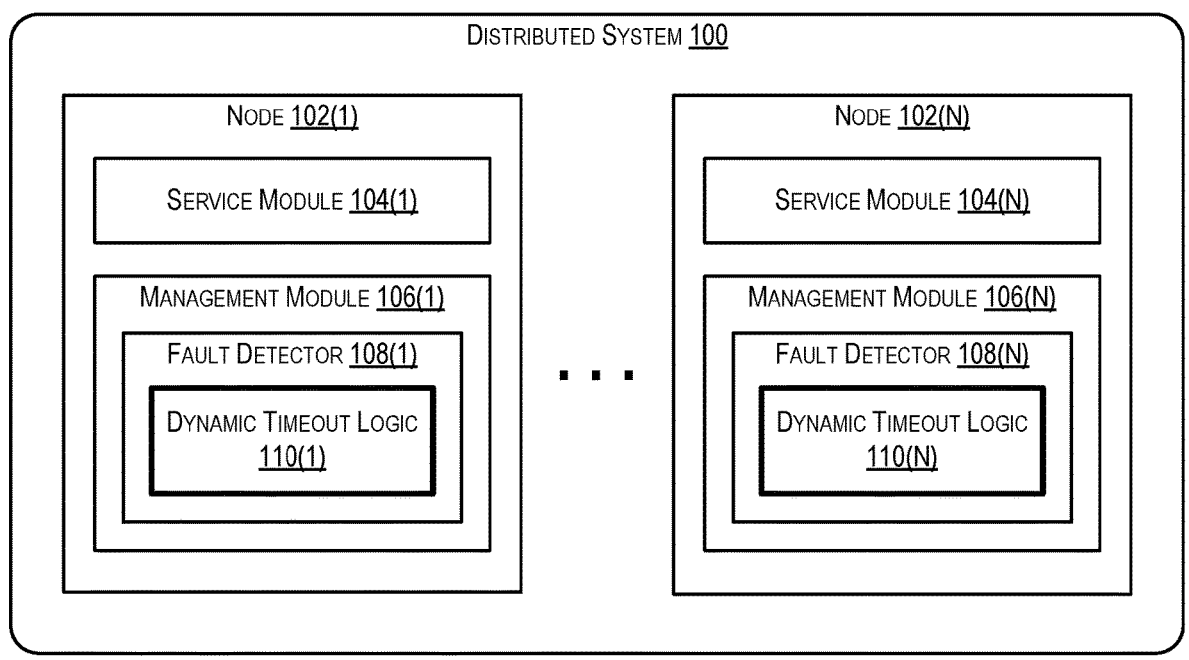
FIG. 1 depicts a distributed system that supports dynamic timeout-based fault detection according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for implementing dynamic timeout-based fault detection in a distributed system. At a high level, these techniques involve dynamically increasing or decreasing the timeout interval that is used by a polling node of the system when polling other (i.e., recipient) nodes of the system to ascertain their health status. For example, during a first polling round, the polling node can transmit poll messages to the recipient nodes and wait for ACK messages from the recipient nodes over an initial (e.g., minimum) timeout interval. If the polling node determines that an ACK message has not been received from at least one recipient node within the initial timeout interval, the polling node can increase the timeout interval by some delta value and can re-attempt the polling action within the current round using the increased timeout interval. As long as the polling node does not receive ACK messages from all recipient nodes in a timely fashion, the polling node can repeat these steps until a maximum timeout interval is reached (at which point the polling node can terminate the first polling round and conclude that any recipient nodes which did not respond within the maximum timeout interval are failed nodes).

Further, during a subsequent polling round after the first polling round, the polling node can transmit poll messages to recipient nodes that were deemed active at the end of the first polling round and can wait for ACK messages from those recipient nodes over a timeout interval corresponding to the last timeout interval used in the first round. If the polling node determines that an ACK message has not been received from at least one recipient node within this "last-used" timeout interval, the polling node can progressively increase the timeout interval as needed (per the process above) until the maximum timeout interval is reached.

On the other hand, if the polling node determines that ACK messages have been received from all recipient nodes within the last-used timeout interval (and the last-used interval is greater than the minimum interval), the polling node can decrease the timeout interval by some delta value and can re-attempt the polling action within the current round using the decreased timeout interval. As long as the polling node receives timely ACK messages from all recipient nodes, the polling node can repeat these steps until the minimum timeout interval is reached again (at which point the polling node can terminate the subsequent polling round and conclude that all of the recipient nodes are still active).

With the general approach outlined above, the polling node can dynamically stretch and compress, within minimum and maximum boundaries, the timeout interval that it uses to identify failed nodes in a manner that is responsive to the degree of inter-node communication latency exhibited by the distributed system at each polling round. Thus, the techniques of the present invention can implement fault detection in partially synchronous distributed systems more effectively and efficiently than existing mechanisms that rely on a static timeout interval. The foregoing and other aspects of the present disclosure are described in further detail in the sections below.

2. System Architecture

FIG. 1 is a simplified block diagram of a distributed system 100 that supports dynamic timeout-based fault detection according to an embodiment. As shown, distributed system 100 comprises a number of nodes 102(1)-(N), which may correspond to physical servers or virtual machines (VMs), Each node 102 includes a service module 104 that is configured to carry out the main processing tasks of distributed system 100. For example, if distributed system 100 is a distributed database, each service module 104 may expose a set of database operations to one or more clients (not shown) that enable the clients to create, modify, delete, and query data/metadata maintained by the system. Upon receiving a client invocation of a particular service operation, service module 104 can execute the operation and return a response (if appropriate) to the client.

In addition to service module 104, each node 102 includes a management module 106. Among other things, management modules 106(1)-(N) are configured to monitor for failures in nodes 102(1)-(N) via a fault detector submodule 108. In various embodiments, if a fault detector 108 detects that a particular node N in distributed system 100 has failed, the fault detector's corresponding management module 106 can update a locally-stored system topology/configuration file (referred to herein as a layout) to indicate that node N is failed and can propagate the updated layout information to other management modules in distributed system 100. Each receiving management module can then refresh its own locally-stored layout with this updated information so that the management module has a local record of the most up-to-date health status of the system (in certain embodiments management modules 106(1)-(N), or some component thereof, may employ a consensus protocol like Paxos in order to reach a system-wide consensus on the correct contents of the layout).

As mentioned in the Background section, one conventional approach for implementing the fault detection logic of fault detector 108 involves using a polling model with a static timeout interval. Under this conventional approach, the fault detector sends out a poll message (also known as a ping or heartbeat message) to other nodes in the system and waits for a responsive acknowledgement or "ACK" message from each recipient node over the duration of the static timeout interval. If the fault detector receives an ACK message from a recipient node within the static timeout interval, the fault detector concludes that the recipient node is healthy/active. On the other hand, if the fault detector does not receive an ACK message from a recipient node within the static timeout interval, the fault detector concludes that the recipient node has experienced a failure. Each fault detector repeats this process of polling other nodes (referred to as a polling round) on a periodic basis in order to keep track of the ongoing health status of the system.

However, a significant problem with the foregoing approach is that, in partially synchronous distributed systems, the delivery of ACK messages generated by active recipient nodes can be unexpectedly delayed for a number of reasons. For example, delivery may be delayed due to network congestion, intermittent packet loss, or a temporary network outage. As another example, delivery may be delayed due to a transient spike in processing load on one or more recipient nodes, which increases the amount of time needed for ACK message generation.

This can lead to several adverse consequences. First, if a recipient node is healthy/active but the delivery of its ACK message to the polling fault detector is delayed due to one of the factors noted above, the fault detector will erroneously conclude that the node is failed when it is not and the node will be removed from the distributed system's layout. As a result, the redundancy/availability of the distributed system will be incorrectly reduced via the exclusion of that node, which can be problematic if the system has a high redundancy/availability requirement or if a large number of nodes are erroneously excluded in this manner.

Second, in situations where the factor(s) that cause delayed ACK message delivery come and go relatively frequently, "flapping" can occur, which means that nodes are erroneously removed from and subsequently re-added to the system's layout on a repeated basis. This flapping phenomenon is detrimental to system performance because each change to the system layout incurs some processing load on the system's nodes and causes a temporary halt in the execution of client-invoked service operations.

One way to mitigate these adverse consequences is to simply increase the length of the static timeout interval, since a sufficiently long interval will reduce or eliminate false positives on the part of the fault detector as well as reduce the likelihood of flapping. However, a long static timeout interval presents its own set of problems, such as increasing the amount of time needed to detect genuine node failures and increasing client response time in scenarios where clients attempt to interact with such failed nodes.

To address the various issues described above, each fault detector 108 in distributed system 100 of FIG. 1 is enhanced to include dynamic timeout logic 110. As described in further detail below, this new logic component enables fault detector 108 to implement round-based polling for fault detection within system 100 in a manner that dynamically scales the timeout interval over a series of iterations within each polling round, rather than relying on a single fixed timeout interval. For instance, if fault detector 108 determines that the communication latency within distributed system 100 has gone up during a polling round (by, e.g., noticing that some nodes are not able to respond to the poll message within a given timeout interval), fault detector 108 can resend the poll message, wait for a slightly longer timeout interval, and repeat these steps until either (1) all nodes are able to respond within the timeout interval or (2) a maximum timeout interval is reached.

Similarly, if fault detector 108 determines that the communication latency within distributed system 100 has gone down during a polling round (by, e.g., noticing that all nodes are able to respond to the poll message within a given timeout interval), fault detector 108 can resend the poll message, wait for a slightly shorter timeout interval, and repeat these steps until either (1) at least one node is unable respond within the timeout interval (at which point the timeout interval can be increased again) or (2) a minimum timeout interval is reached. Fault detector 108 can then carry over the final (i.e., last used) timeout interval from the current polling round to the next polling round.

With this dynamic timeout-based approach, fault detectors 108(1)-(N) of distributed system 100 can carry out their duties while minimizing or avoiding the drawbacks associated with a static timeout interval. For example, by lengthening the timeout interval when needed, each fault detector 108 can reduce the occurrence of false positives and the likelihood of flapping. At the same time, by performing this lengthening incrementally and also shortening the timeout interval when needed, each fault detector 108 can avoid the problems associated with an excessively long static timeout interval. Details for implementing fault detector 108 with dynamic timeout logic 110 are described in the sections that follow.

It should be appreciated that distributed system 100 of FIG. 1 is illustrative and not intended to limit embodiments of the present disclosure. For example, although FIG. 1 depicts a particular arrangement of entities in distributed system 100, other arrangements or configurations are possible depending on the specific system. Further, the various entities shown may have subcomponents or functions that are not specifically described. One of ordinary skill in the art will recognize other variations, modifications, and alternatives.

3. Fault Detection Workflows

Figure 2:
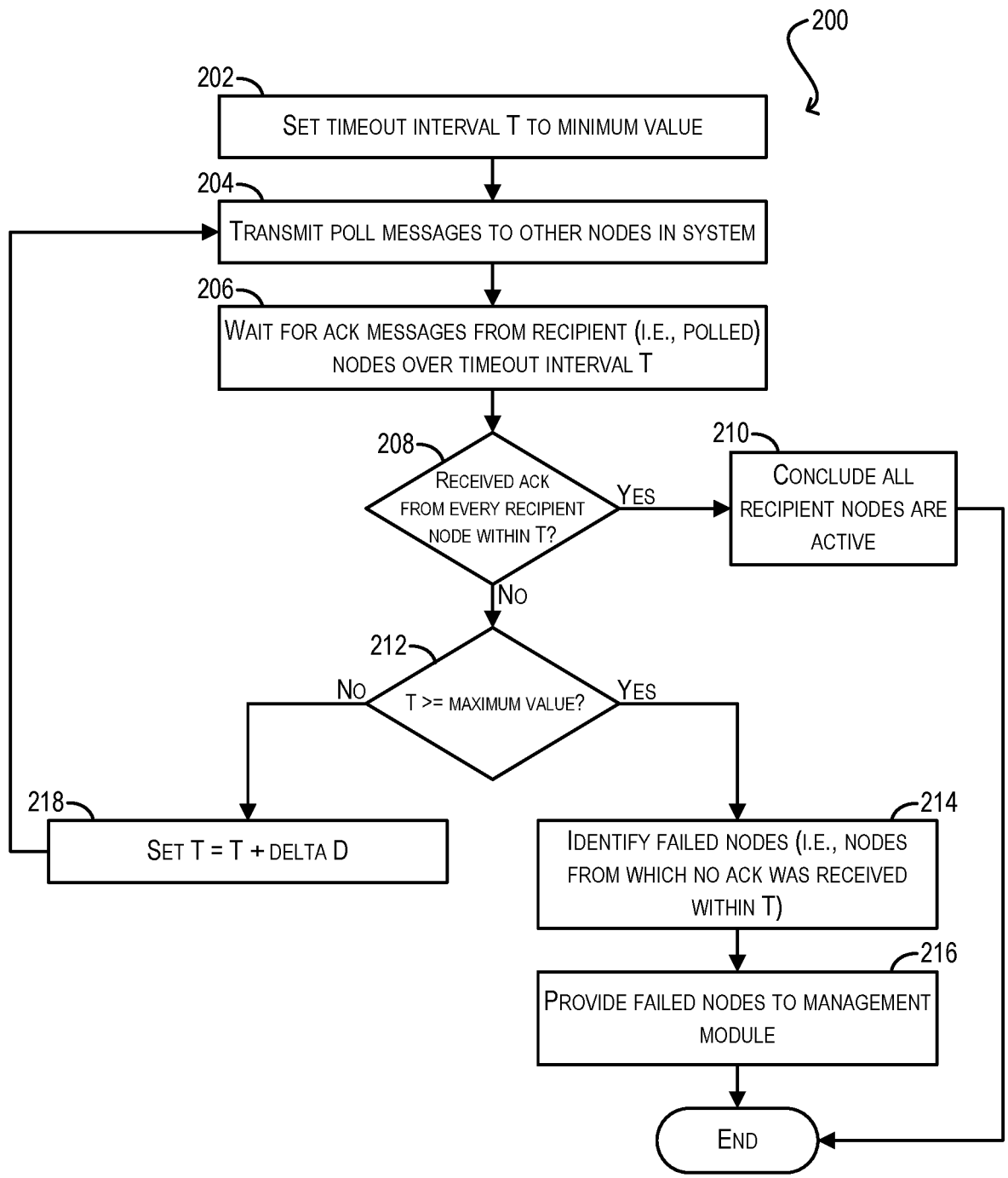
FIG. 2 depicts a workflow for executing a first polling round using a dynamic timeout according to an embodiment.

FIG. 2 depicts a workflow 200 that may be performed by fault detector 108 of a given node 102 (via logic 110) for carrying out a first polling round using a dynamic timeout interval according to an embodiment. As mentioned previously, a "polling round" is a process whereby fault detector 108 polls other nodes in distributed system 100 and determines their current health (i.e., active or failed) status. Fault detector 108 can execute one polling round every X seconds, minutes, or some other periodic basis in order to keep track of the ongoing health of system 100. The "first" polling round is the initial polling round executed by fault detector 108 after system startup.

Starting with block 202, fault detector 108 can set a variable T (corresponding to the timeout interval to be used in the current round) to some minimum value (e.g., X seconds). This minimum timeout interval may be preconfigured by an administrator of distributed system 100 based on the best case scenario for inter-node communication latency within system 100.

At blocks 204 and 206, fault detector 108 can transmit a poll message to every other node within distributed system 100 and can wait for an ACK message from each recipient node over timeout interval T. In some embodiments, fault detector 108 may also send a poll message to itself (i.e., the node running detector 108) in order to gauge the health status of its own node.

At block 208, fault detector 108 can check whether it has received an ACK message from all recipient nodes within timeout interval T. If yes, fault detector 108 can conclude that all recipient nodes are healthy/active (block 210) and thus can end this round.

However, if fault detector 108 determines that it did not receive an ACK message from all recipient nodes within T at block 208, fault detector 108 can further check whether the current value of T greater than or equal to some maximum timeout interval (e.g., Y seconds, where Y>X) (block 212). Like the minimum timeout interval, this maximum timeout interval may be preconfigured by an administrator of distributed system 100.

If T equals or is greater than the maximum timeout interval at block 212, fault detector 108 can identify the failed nodes in the system (i.e., the recipient nodes from which detector 108 did not receive ACK messages within T in the last iteration) (block 214), provide this failed node information to management module 106 (which can mark those nodes as failed in the system layout) (block 216), and terminate the current round.

On the other hand, if T is less than the maximum timeout interval at block 212, fault detector 108 can set T to T plus a delta value D (e.g., Z seconds, where Z<(Y−X)) (block 218). Thus, fault detector 108 can increase the timeout interval by D at this step. Fault detector 108 can then return to block 204 in order to execute another iteration of blocks 204-218 using the newly increased timeout interval, and this process can repeat until the round is terminated after block 210 or block 216.

Figure 3A:
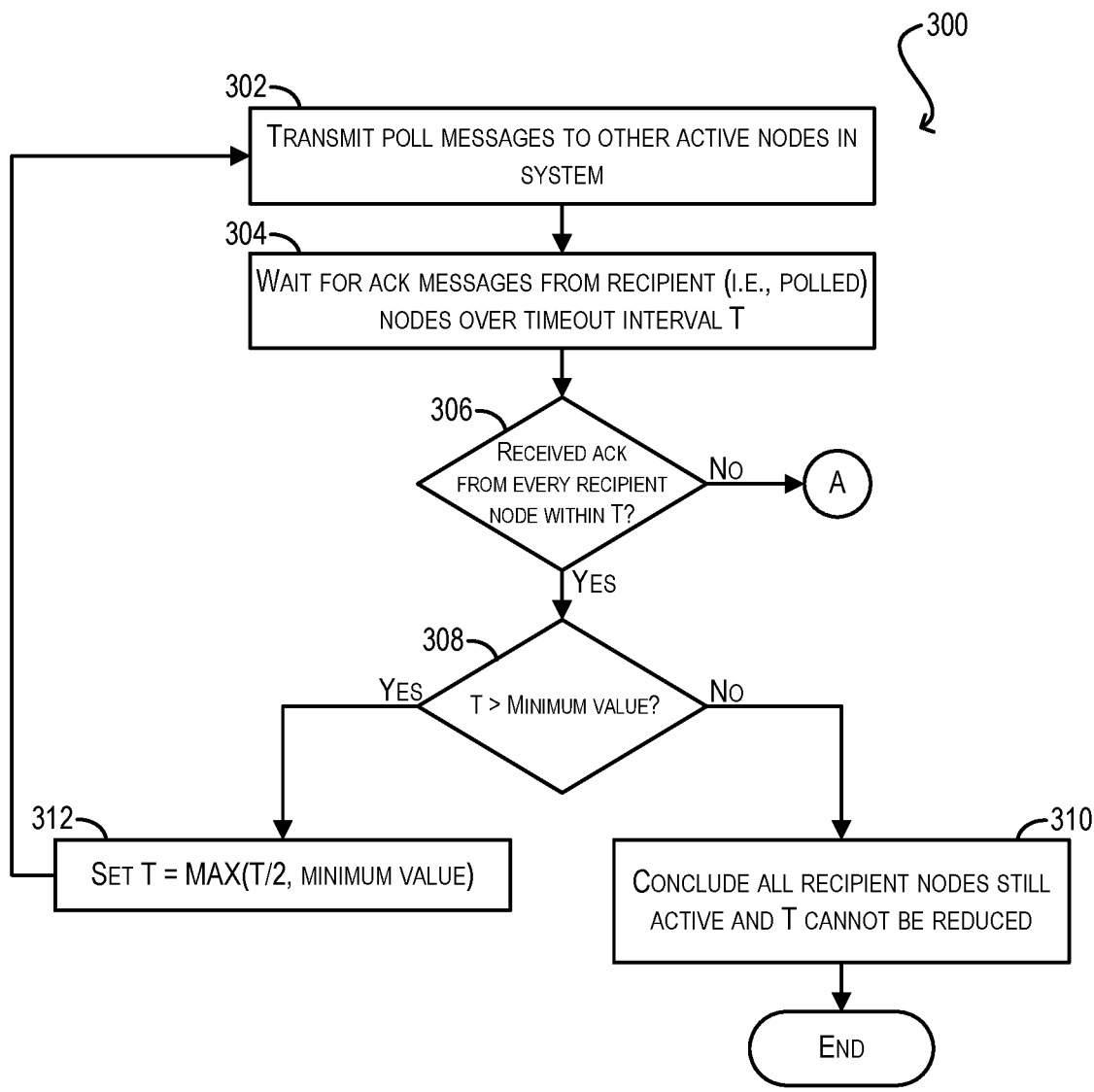
FIGS. 3A and 3B depict a workflow for executing a second or subsequent polling round using a dynamic timeout according to an embodiment.
Figure 3B:
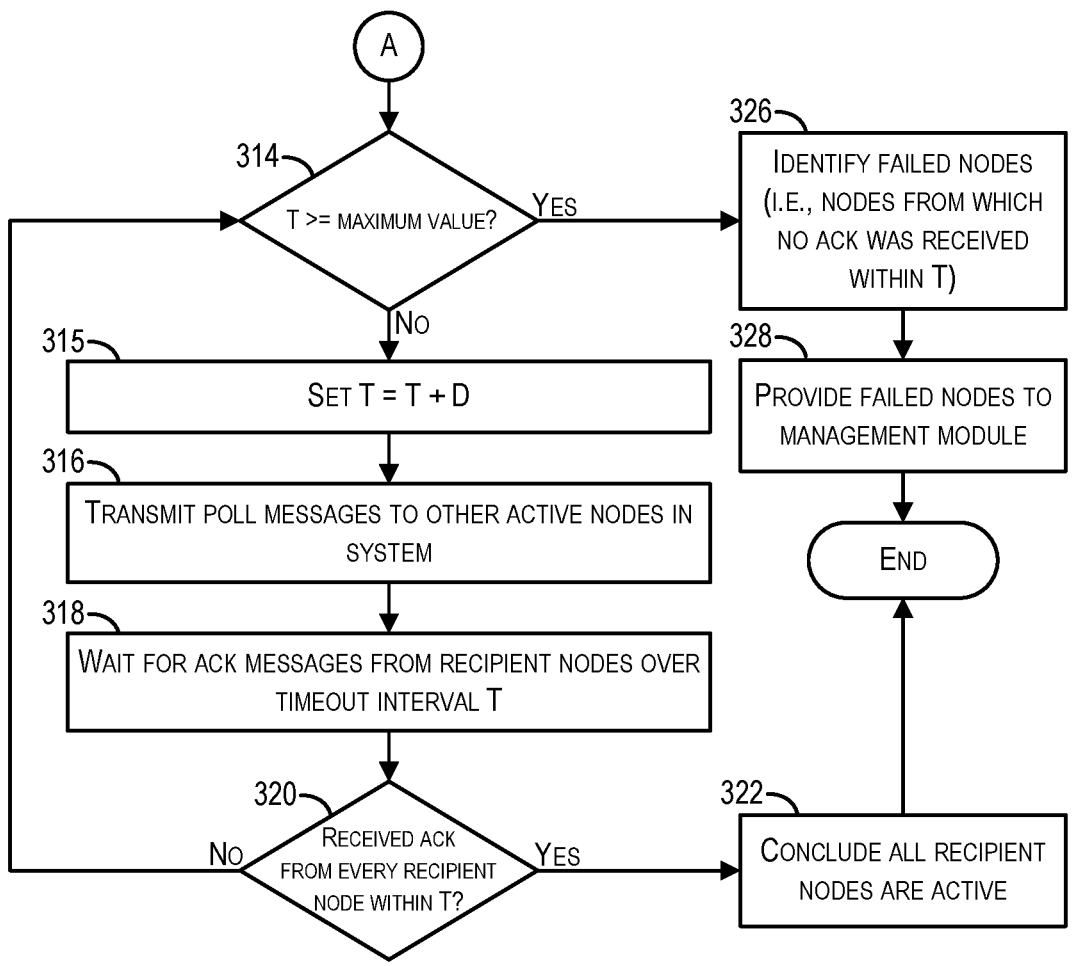

FIGS. 3A and 3B depict a workflow 300 that may be performed by fault detector 108 of a given node 102 (via logic 110) for carrying out a second or subsequent polling round using a dynamic timeout interval according to an embodiment. Workflow 300 assumes that fault detector 108 has already completed at least a first polling round via workflow 200 of FIG. 2 and variable T is currently set to the last value of T from the immediately previous polling round.

Starting with blocks 302 and 304 of FIG. 3A, fault detector 108 can transmit a poll message to every other node in distributed system 100 deemed active as of the last polling round and can wait for an ACK message from each recipient node over timeout interval T. As mentioned previously, in some cases fault detector 108 may also send a poll message to itself at step 302.

At block 306, fault detector 108 can check whether it has received an ACK message from all recipient nodes within timeout interval T. If yes, fault detector 108 can further check whether T is greater than the minimum timeout interval (block 308) and if not, can conclude that all of the recipient nodes are still active and T cannot be reduced (block 310). Accordingly, fault detector 108 can end the current round.

If T is greater than the minimum timeout interval at block 308, fault detector 108 can set T to the maximum of either (1) T divided by 2 or (2) the minimum timeout interval (block 312). Thus, fault detector 108 can decrease T by 50% or to the minimum value at this step, whichever is greater. Fault detector 108 can then return to block 302 and repeat the preceding steps.

If fault detector 108 determines that it has not received an ACK message from at least one recipient node at block 306, fault detector 108 can proceed to FIG. 3B. At block 314 of FIG. 3B, fault detector 108 can check whether T is greater or equal to the maximum timeout interval. If so, fault detector 108 can identify the failed nodes in the system (i.e., the recipient nodes from which detector 108 did not receive ACK messages within T in the last iteration) (block 326), provide this failed node information to management module 106 (which can mark those nodes as failed in the system layout) (block 328), and terminate the current round.

On the other hand, if T is less than the maximum timeout interval at block 314, fault detector 108 can increment T by delta value D (block 315), once again transmit a poll message to every other active node within distributed system 100 (block 316), and wait for an ACK message from each recipient node over increased timeout interval T (block 318). If fault detector 108 receives an ACK message from every recipient node (block 320), fault detector 108 can conclude that all recipient nodes are healthy/active (block 322) and thus can end this round.

However, if fault detector 108 determines that it did not receive an ACK message from all recipient nodes within T at block 320, fault detector 108 can return to block 314 and the steps of FIG. 3B can be repeated until a termination condition is reached after block 322 or block 328.

It should be appreciated that workflows 200 and 300 of FIGS. 2 and 3A/3B are illustrative and can be modified in various ways. For example, although FIG. 3A depicts one particular policy for incrementally reducing the timeout interval in the second/subsequent polling round (i.e., decreasing T by 50%), other policies for reducing T are also possible, such as decrementing T by some other percentage or by previously-mentioned delta value D (or some other predefined delta value).

In addition, although not shown in workflows 200 and 300, nodes that are deemed to be failed in a given polling round may be monitored by fault detector 108 via a separate background process to determine when/if they become active again. Once a failed node is detected as being active again via this background process, the node may be re-added to the set of active nodes in the system's layout.

4. Example Scenario

To further clarify the processing of workflows 200 and 300, consider an example scenario with the following parameters/assumptions:

Distributed system 100 comprises 4 nodes N1, N2, N3, and N4

Fault detector 108 of N1 executes workflows 200 and 300

The minimum timeout interval is 4 seconds, the maximum timeout interval is 12 seconds, and delta value D is 2 seconds At the time of a first polling round, N4 is failed, the latency for receiving an ACK message at N1 from N2 is 3 seconds, and the latency for receiving an ACK message at N1 from N3 is 7 seconds At the time of a second polling round, the latency for receiving an ACK message at N1 from N2 is 3 seconds and the latency for receiving an ACK message at N1 from N3 is 5 seconds At the time of a third polling round, the latency for receiving an ACK message at N1 from N2 is 3 seconds and the latency for receiving an ACK message at N1 from N3 is 2 seconds Given the foregoing, the following sequence of events will occur in accordance with workflows 200 and 300:

During the first polling round:
1. Fault detector of N1 will poll N2, N3, and N4 with a timeout interval T of 4 seconds
2. N3 and N4 will fail to respond within T and fault detector will increase T to 6 seconds
3. Fault detector of N1 will poll N2, N3, and N4 again with a timeout interval T of 6 seconds
4. N3 and N4 will fail to respond within T and fault detector will increase T to 8 seconds
5. Fault detector of N1 will poll N2, N3, and N4 again with a timeout interval T of 8 seconds
6. N4 will fail to respond within T and fault detector will increase T to 10 seconds
7. Fault detector of N1 will poll N2, N3, and N4 again with a timeout interval T of 10 seconds
8. N4 will fail to respond within T and fault detector will increase T to 12 seconds
9. Fault detector of N1 will poll N2, N3, and N4 again with a timeout interval T of 12 seconds
10. N4 will fail to respond within T; fault detector will conclude that T4 is failed and end the round During the second polling round:
1. Fault detector of N1 will poll N2 and N3 with a timeout interval T of 12 seconds (i.e., the last value of T from the first polling round)
2. Both N2 and N3 will respond within T and fault detector will cut T in half to 6 seconds
3. Fault detector of N1 will poll N2 and N3 again with a timeout interval T of 6 seconds
4. N3 will fail to respond within T and fault detector will increase T to 8 seconds
5. Fault detector of N1 will poll N2 and N3 again with a timeout interval T of 8 seconds
6. Both N2 and N3 will respond within T; fault detector will conclude that N2 and N3 are still active and end the round During the third polling round:
1. Fault detector of N1 will poll N2 and N3 with a timeout interval T of 8 seconds (i.e., the last value of T from the second polling round)
2. Both N2 and N3 will respond within T and fault detector will cut T in half to 4 seconds
3. Fault detector of N1 will poll N2 and N3 again with a timeout interval T of 4 seconds
4. Both N2 and N3 will respond within T; fault detector will conclude that N2 and N3 are still active but T cannot be reduced any further and thus will end the round Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing dynamic timeout-based fault detection in a distributed system, the method comprising:
 during a first polling round occurring at a first time t1:
  setting, by a node in the distributed system, a timeout interval to a minimum value;
  transmitting, by the node, poll messages to other nodes in the distributed system;
  waiting, by the node, for acknowledgement messages from all of the other nodes, the acknowledgement messages being responsive to the poll messages;
  checking, by the node, whether the node has received the acknowledgement messages from all of the other nodes within the timeout interval; and
  if the node has failed to receive an acknowledgement message from at least one of the other nodes within the timeout interval and if the timeout interval is less than a maximum value:
   incrementing, by the node, the timeout interval by a first delta value; and
   repeating the setting, the transmitting, the waiting, and the checking until the node receives the acknowledgement messages from all of the other nodes within the timeout interval or the timeout interval reaches or exceeds the maximum value; and
 during a second polling round occurring at a second time t2:
  transmitting, by the node, further poll messages to at least a portion of the other nodes in the distributed system;
  waiting, by the node, for further acknowledgement messages from all of the portion of the other nodes, the further acknowledgement messages being responsive to the further poll messages;
  checking, by the node, whether the node has received the further acknowledgement messages from all of the portion of the other nodes within the timeout interval; and
  if the node has received the further acknowledgement messages from all of the portion of the other nodes within the timeout interval and if the timeout interval is greater than the minimum value:
   decrementing, by the node, the timeout interval by a second delta value; and
   repeating the transmitting of further poll messages, the waiting for further acknowledgment messages, the checking whether the node has received the further acknowledgement messages, and the decrementing of the timeout interval by the second delta value until either the node fails to receive a further acknowledgement message from at least one of the portion of the other nodes within the timeout interval or the timeout interval reaches the minimum value.

2. The method of claim 1 further comprising, if the node has received the acknowledgement messages from all of the other nodes within the timeout interval during the first polling round:
 concluding, by the node, that all of the other nodes are active.

3. The method of claim 1 further comprising, if the timeout interval reaches or exceeds the maximum value during the first polling round:
 identifying, by the node, one or more of the other nodes from which the node did not receive an acknowledgement message with the timeout interval; and
 marking, by the node, the identified nodes as failed within a configuration file for the distributed system.

4. The method of claim 1 further comprising, if the timeout interval reaches the minimum value during the second polling round:
 concluding, by the node, that all of the portion of the other nodes are still active.

5. The method of claim 1 further comprising, during the second polling round, if the node has failed to receive a further acknowledgement message from at least one of the portion of the other nodes within the timeout interval and if the timeout interval is less than the maximum value:
 incrementing, by the node, the timeout interval by the first delta value;
 transmitting, by the node, yet further poll messages to the portion of the other nodes in the distributed system;
 waiting, by the node, for yet further acknowledgement messages from all of the portion of the other nodes, the yet further acknowledgement messages being responsive to the yet further poll messages;
 checking, by the node, whether the node has received the yet further acknowledgement messages from all of the portion of the other nodes within the timeout interval; and
 if the node has failed to receive a yet further acknowledgement message from at least one of the portion of the other nodes within the timeout interval, repeating the incrementing, the transmitting of the yet further poll messages, the waiting for the yet further acknowledgment messages, and the checking whether the node has received the yet further acknowledgement messages.

6. The method of claim 1 wherein the second delta value is a percentage of the timeout interval.

7. The method of claim 1 wherein the portion of the other nodes to which the further poll messages are sent during the second polling round are nodes in the distributed system that were deemed active during the first polling round.

8. A non-transitory computer readable storage medium having stored thereon program code executable by a node in a distributed system, the program code embodying a method for implementing dynamic timeout-based fault detection in the distributed system, the method comprising:
 during a first polling round occurring at a first time t1:
  setting a timeout interval to a minimum value;
  transmitting poll messages to other nodes in the distributed system;
  waiting for acknowledgement messages from all of the other nodes, the acknowledgement messages being responsive to the poll messages;
  checking whether the node has received the acknowledgement messages from all of the other nodes within the timeout interval; and if the node has failed to receive an acknowledgement message from at least one of the other nodes within the timeout interval and if the timeout interval is less than a maximum value:
  incrementing the timeout interval by a first delta value; and
  repeating the setting, the transmitting, the waiting, and the checking until either the node receives the acknowledgement messages from all of the other nodes within the timeout interval or the timeout interval reaches or exceeds the maximum value; and during a second polling round occurring at a second time t2:
  transmitting further poll messages to at least a portion of the other nodes in the distributed system;
  waiting for further acknowledgement messages from all of the portion of the other nodes, the further acknowledgement messages being responsive to the further poll messages;
  checking whether the node has received the further acknowledgement messages from all of the portion of the other nodes within the timeout interval; and
  if the node has received the further acknowledgement messages from all of the portion of the other nodes within the timeout interval and if the timeout interval is greater than the minimum value:
    decrementing the timeout interval by a second delta value; and
    repeating the transmitting of further poll messages, the waiting for further acknowledgment messages, the checking whether the node has received the further acknowledgement messages, and the decrementing of the timeout interval by the second delta value until either the node fails to receive a further acknowledgement message from at least one of the portion of the other nodes within the timeout interval or the timeout interval reaches the minimum value.

9. The non-transitory computer readable storage medium of claim 8 wherein the method further comprises, if the node has received the acknowledgement messages from all of the other nodes within the timeout interval during the first polling round:
  concluding that all of the other nodes are active.

10. The non-transitory computer readable storage medium of claim 8 wherein the method further comprises, if the timeout interval reaches or exceeds the maximum value during the first polling round:
  identifying one or more of the other nodes from which the node did not receive an acknowledgement message with the timeout interval; and
  marking the identified nodes as failed within a configuration file for the distributed system.

11. The non-transitory computer readable storage medium of claim 8 wherein the method further comprises, if the timeout interval reaches the minimum value during the second polling round:
  concluding that all of the portion of the other nodes are still active.

12. The non-transitory computer readable storage medium of claim 8 wherein the method further comprises, during the second polling round, if the node has failed to receive a further acknowledgement message from at least one of the portion of the other nodes within the timeout interval and if the timeout interval is less than the maximum value:
  incrementing the timeout interval by the first delta value;
  transmitting yet further poll messages to the portion of the other nodes in the distributed system;
  waiting for yet further acknowledgement messages from all of the portion of the other nodes, the yet further acknowledgement messages being responsive to the yet further poll messages;
  checking whether the node has received the yet further acknowledgement messages from all of the portion of the other nodes within the timeout interval; and
  if the node has failed to receive a yet further acknowledgement message from at least one of the portion of the other nodes within the timeout interval, repeating the incrementing, the transmitting of the yet further poll messages, the waiting for the yet further acknowledgment messages, and the checking whether the node has received the yet further acknowledgement messages.

13. The non-transitory computer readable storage medium of claim 8 wherein the second delta value is a percentage of the timeout interval.

14. The non-transitory computer readable storage medium of claim 8 wherein the portion of the other nodes to which the further poll messages are sent during the second polling round are nodes in the distributed system that were deemed active during the first polling round.

15. A node of a distributed system, the node comprising:
  a processor; and
  a non-transitory computer readable medium having stored thereon program code that, when executed, causes the processor to:
    during a first polling round occurring at a first time t1:
      set a timeout interval to a minimum value;
      transmit poll messages to other nodes in the distributed system;
      wait for acknowledgement messages from all of the other nodes, the acknowledgement messages being responsive to the poll messages;
      check whether the node has received the acknowledgement messages from all of the other nodes within the timeout interval; and
      if the node has failed to receive an acknowledgement message from at least one of the other nodes within the timeout interval and if the timeout interval is less than a maximum value:
        increment the timeout interval by a first delta value; and
        repeat the setting, the transmitting, the waiting, and the checking until either the node receives the acknowledgement messages from all of the other nodes within the timeout interval or the timeout interval reaches or exceeds the maximum value; and
    during a second polling round occurring at a second time t2:
      transmit further poll messages to at least a portion of the other nodes in the distributed system;
      wait for further acknowledgement messages from all of the portion of the other nodes, the further acknowledgement messages being responsive to the further poll messages;
      check whether the node has received the further acknowledgement messages from all of the portion of the other nodes within the timeout interval; and
      if the node has received the further acknowledgement messages from all of the portion of the other nodes within the timeout interval and if the timeout interval is greater than the minimum value:

decrement the timeout interval by a second delta value; and repeat the transmitting of further poll messages, the waiting for further acknowledgment messages, the checking whether the node has received the further acknowledgement messages, and the decrementing of the timeout interval by the second delta value until either the node fails to receive a further acknowledgement message from at least one of the portion of the other nodes within the timeout interval or the timeout interval reaches the minimum value.

16. The node of claim 15 wherein the program code further causes the processor to, if the node has received the acknowledgement messages from all of the other nodes within the timeout interval during the first polling round:

conclude that all of the other nodes are active.

17. The node of claim 15 wherein the program code further causes the processor to, if the timeout interval reaches or exceeds the maximum value during the first polling round:

identify one or more of the other nodes from which the node did not receive an acknowledgement message with the timeout interval; and mark the identified nodes as failed within a configuration file for the distributed system.

18. The node of claim 15 wherein the program code further causes the processor to, if the timeout interval reaches the minimum value during the second polling round:

conclude that all of the portion of the other nodes are still active.

19. The node of claim 15 wherein the program code further causes the processor to, during the second polling round, if the node has failed to receive a further acknowledgement message from at least one of the portion of the other nodes within the timeout interval and if the timeout interval is less than the maximum value:

increment the timeout interval by the first delta value;

transmit yet further poll messages to the portion of the other nodes in the distributed system;

wait for yet further acknowledgement messages from all of the portion of the other nodes, the yet further acknowledgement messages being responsive to the yet further poll messages;

check whether the node has received the yet further acknowledgement messages from all of the portion of the other nodes within the timeout interval; and if the node has failed to receive a yet further acknowledgement message from at least one of the portion of the other nodes within the timeout interval, repeat the incrementing, the transmitting of the yet further poll messages, the waiting for the yet further acknowledgment messages, and the checking whether the node has received the yet further acknowledgement messages.

20. The node of claim 15 wherein the second delta value is a percentage of the timeout interval.

21. The node of claim 15 wherein the portion of the other nodes to which the further poll messages are sent during the second polling round are nodes in the distributed system that were deemed active during the first polling round.

* * * * *